US012715273B2

(12) United States Patent
Rees

(10) Patent No.: US 12,715,273 B2
(45) Date of Patent: Aug. 25, 2026

(54) CLAMP FOR SHAPED CAGE

(71) Applicant: Super ATV, LLC, Madison, IN (US)

(72) Inventor: Eric Rees, North Vernon, IN (US)

(73) Assignee: Super ATV, LLC, Madison, IN (US)

( * ) Notice: Subject to any disclaimer, the term of this patent is extended or adjusted under 35 U.S.C. 154(b) by 338 days.

(21) Appl. No.: 18/408,643

(22) Filed: Jan. 10, 2024

(65) Prior Publication Data

US 2025/0222749 A1 Jul. 10, 2025

(51) Int. Cl.
*B60J 1/00* (2006.01)
*F16B 2/06* (2006.01)

(52) U.S. Cl.
CPC ............... *B60J 1/006* (2013.01); *F16B 2/065* (2013.01)

(58) Field of Classification Search
CPC .................................. B60J 1/006; F16B 2/065
See application file for complete search history.

(56) References Cited

U.S. PATENT DOCUMENTS 4,343,503 A * 8/1982 Samuelson ................ B60J 1/02 296/96.21
5,230,496 A * 7/1993 Shillington ............... F16L 3/12 248/74.1
5,463,189 A * 10/1995 Deneke .................... H02G 3/26 24/336
5,941,653 A 8/1999 Clpriani
5,975,615 A * 11/1999 Showalter .................. B60J 1/06 296/84.1
7,267,388 B2 * 9/2007 Hanson, Jr. ................ B60J 1/06 52/204.597
7,309,054 B2 12/2007 Slatter
D571,195 S * 6/2008 Larsen ........................... D8/394
8,087,711 B1 * 1/2012 Mauro ....................... B60J 1/06 296/89
9,809,994 B1 * 11/2017 Neff .................... E04H 17/1426
9,884,647 B2 2/2018 Peterson
11,472,268 B1 * 10/2022 Vanover ..................... B60J 1/06
12,458,183 B1 * 11/2025 Lee ......................... F16B 2/065
D1,108,251 S * 1/2026 Tuthill ........................... D8/394
2005/0048640 A1 * 3/2005 Kennedy ............. A61M 5/1452 24/518

(Continued)

FOREIGN PATENT DOCUMENTS

GB 2578862 B 4/2023
WO 2023/050192 A1 4/2023

*Primary Examiner* — Patricia L Engle
(74) *Attorney, Agent, or Firm* — Woodard, Emhardt, Henry, Reeves & Wagner, LLP

(57) ABSTRACT

A clamp assembly configured to couple to a non-circular structural element on a vehicle. The clamp assembly includes a clamp body that defines a central opening. The central opening is shaped to conform partially conform to and configured to receive the non-circular structural element. The clamp body further defines a lateral opening between two ends that allows the non-circular structural element to pass into the central opening. Between the two ends, the clamp body includes flexible portions that allow the clamp body to flex and adjust the sizes of the central opening and lateral opening. The clamp body further includes a non-flexible portion between the flexible portions. The flexible portions and ends define a concave portion of the central opening, and the non-flexible portion defines a convex portion of the central opening.

20 Claims, 11 Drawing Sheets

(56) References Cited

U.S. PATENT DOCUMENTS

| | | | | |
|---|---|---|---|---|
| 2007/0017742 | A1* | 1/2007 | Latimer | F16B 2/065<br>182/82 |
| 2013/0219678 | A1* | 8/2013 | Brewster | F16B 2/065<br>24/486 |
| 2014/0203588 | A1* | 7/2014 | Tyrer | B60J 5/0487<br>296/79 |
| 2015/0322981 | A1 | 11/2015 | Hudson, III | |
| 2017/0223439 | A1* | 8/2017 | Cross | F16M 13/022 |
| 2020/0047594 | A1* | 2/2020 | Gulledge | B60J 1/006 |
| 2023/0151834 | A1* | 5/2023 | Kovacs | F16M 13/022<br>361/825 |
| 2023/0191901 | A1 | 6/2023 | Rao | |
| 2024/0001739 | A1* | 1/2024 | Couture | B62D 25/06 |
| 2024/0352735 | A1* | 10/2024 | Moss | E04D 3/36 |

* cited by examiner 72
70

114
114

70
72
72
120
114
70

CLAMP FOR SHAPED CAGE

BACKGROUND

The present disclosure relates to mounting clamps for a vehicle.

Mounting clamps are commonly used to mount an attachment to a vehicle, such as an all-terrain vehicle (ATV), utility task vehicle (UTV), and other types of vehicles. Such attachments can include windshields, lamps, flags, antennae, visors, holsters for electronic devices, hangers for equipment, and/or other objects. Typically, mounting clamps are attached to a structural portion of the vehicle, such as the cage or frame. Many cages can be formed from a collection tubes, bars, and/or other structural pieces, and the mounting clamp may be configured to couple around such structures.

In some cases, the mounting clamp cannot effectively couple an attachment to the cage of the vehicle. The shape of the tubes, bars, or other structures can sometimes make it difficult to reliably mount equipment to the vehicle using the clamp. For example, the shape of the structure may allow the mounting clamp to rotate, slip, shake, detach, and/or move in another way when a user attempts to mount an attachment to the vehicle cage. The shape of the structure may also allow the clamp to move and/or become loose when the user operates the vehicle. Additionally or alternatively, the mounting clamp might not adequately conform to the shape of the cage structure. For example, the mounting clamp may only be able to couple to a specific size and shape of cage and might not accommodate cages with small discrepancies from that size or shape.

DESCRIPTION OF THE SELECTED EMBODIMENTS

Figure 1:
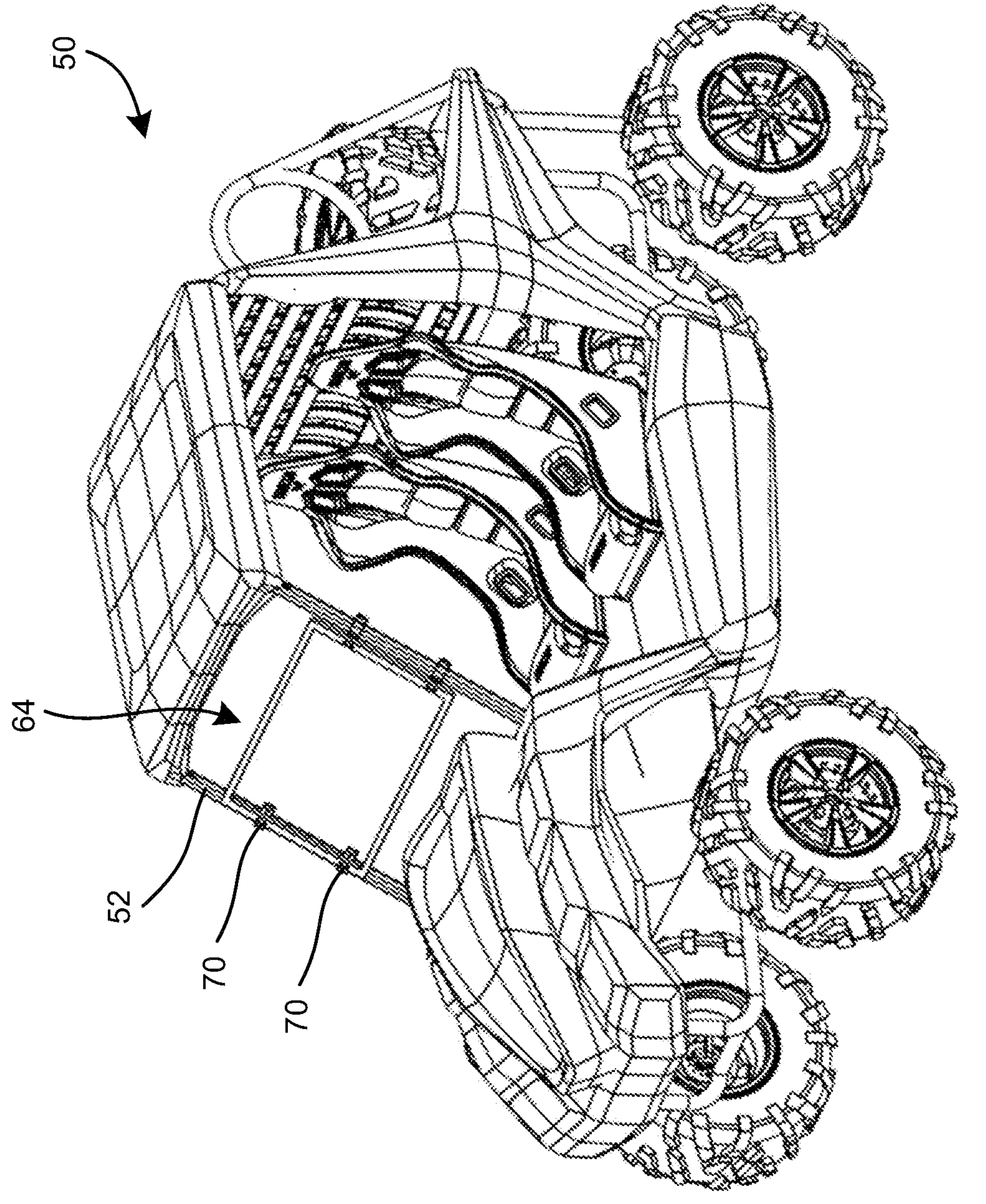
FIG. 1 is a perspective view of a clamp assembly attached to a vehicle and an attachment.

For the purpose of promoting an understanding of the principles of the claimed invention, reference will now be made to the embodiments illustrated in the drawings and specific language will be used to describe the same. It will nevertheless be understood that no limitation of the scope of the claimed invention is thereby intended. Any alterations and further modifications in the described embodiments, and any further applications of the principles of the claimed invention as described herein are contemplated as would normally occur to one skilled in the art to which the claimed invention relates. One embodiment of the claimed invention is shown in great detail, although it will be apparent to those skilled in the relevant art that some features that are not relevant to the present claimed invention may not be shown for the sake of clarity.

With respect to the specification and claims, it should be noted that the singular forms “a”, “an”, “the”, and the like include plural referents unless expressly discussed otherwise. As an illustration, references to “a device” or “the device” include one or more of such devices and equivalents thereof. It also should be noted that directional terms, such as “left”, “right”, “up”, “down”, “top”, “bottom”, and the like, are used herein solely for the convenience of the reader in order to aid in the reader’s understanding of the illustrated embodiments, and it is not the intent that the use of these directional terms in any manner limit the described, illustrated, and/or claimed features to a specific direction and/or orientation.

Referring to FIG. 1, one embodiment of a vehicle 50 is shown. Vehicle 50 can be an all-terrain vehicle (ATV), a utility task vehicle (UTV), and/or another type of vehicle. Vehicle 50 generally includes one or more structural elements 52. Structural elements 52 can be a part of the frame and/or cage of vehicle 50. In one example, structural elements 52 can be formed from tubes and/or bars of rigid material, such as steel or aluminum. Vehicle 50 can optionally include an attachment 64. Generally, attachment 64 can include functional devices and/or decorative objects, such as a windshield, light, antenna, mirror, flag, visor, holster for a portable device, hanger for equipment, and/or another object. In the illustrated example, attachment 64 is a windshield. As shown, a clamp assembly 70 can be used to couple attachment 64 to vehicle 50. In the illustrated embodiment, multiple clamp assemblies 70 couple attachment 64 to structural elements 52 of vehicle 50.

Figure 2:
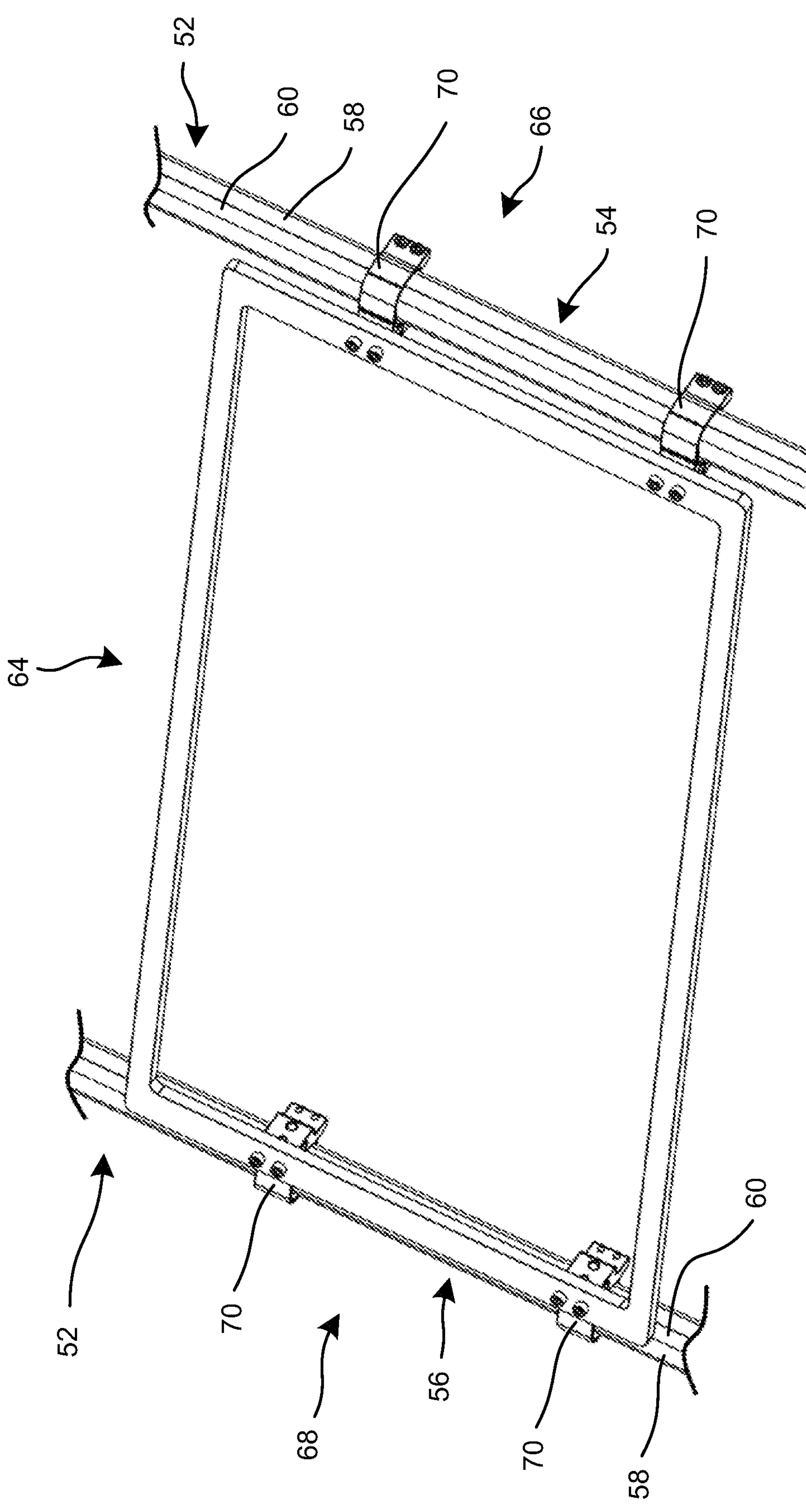
FIG. 2 is a zoomed perspective view of the FIG. 1 clamp assembly, vehicle, and attachment.
Figure 3:
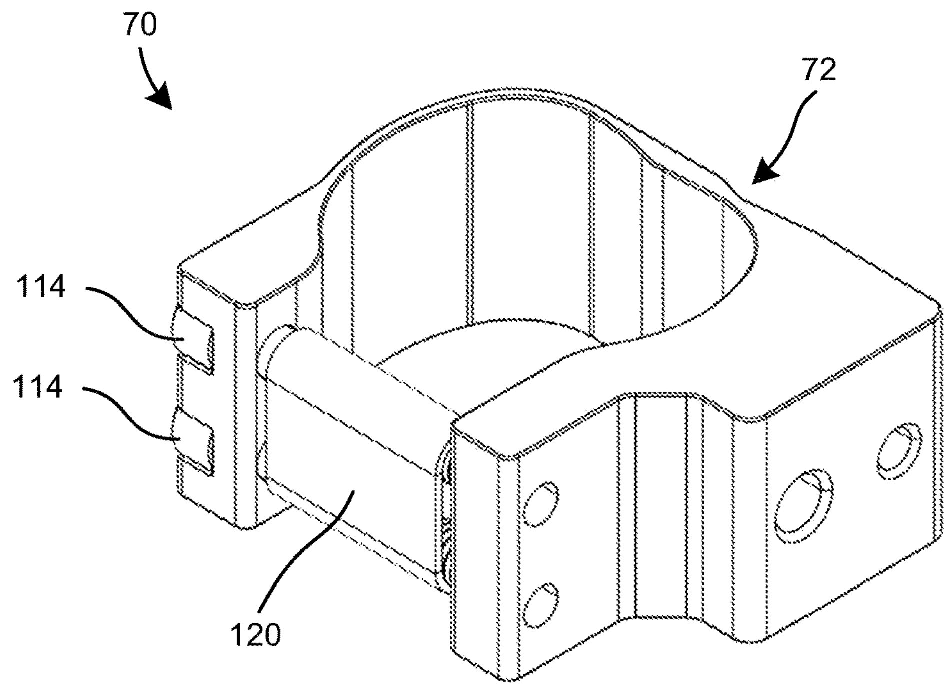
FIG. 3 is a front right perspective view of the FIG. 1 clamp assembly.
Figure 4:
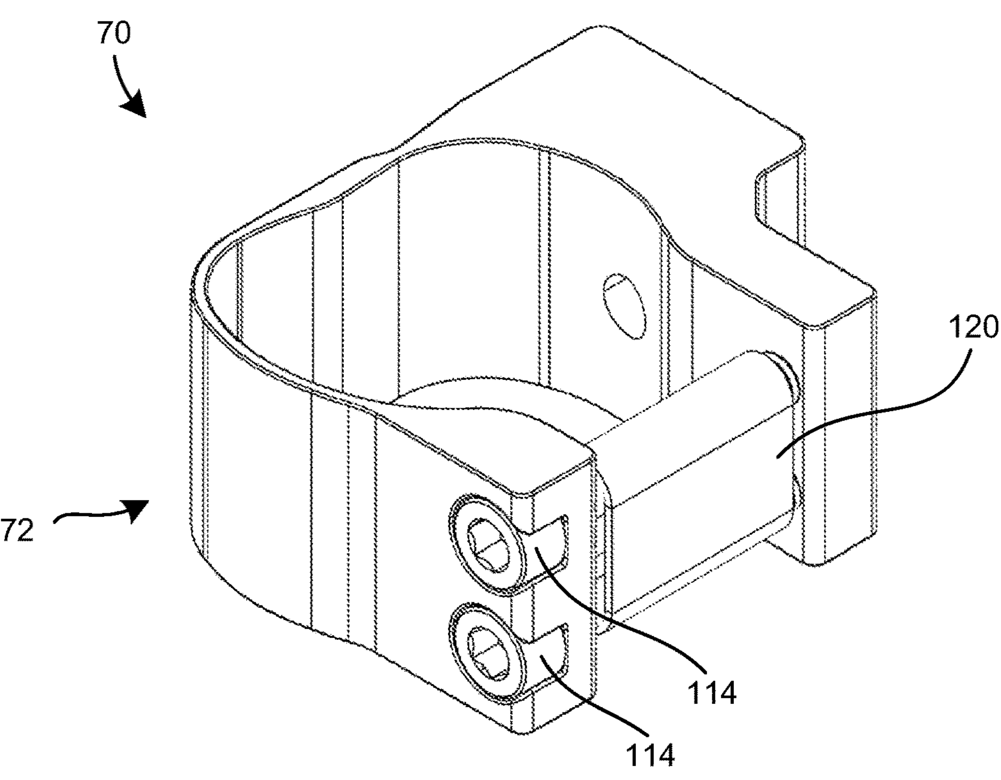
FIG. 4 is a front left perspective view of the FIG. 1 clamp assembly.
Figure 5:
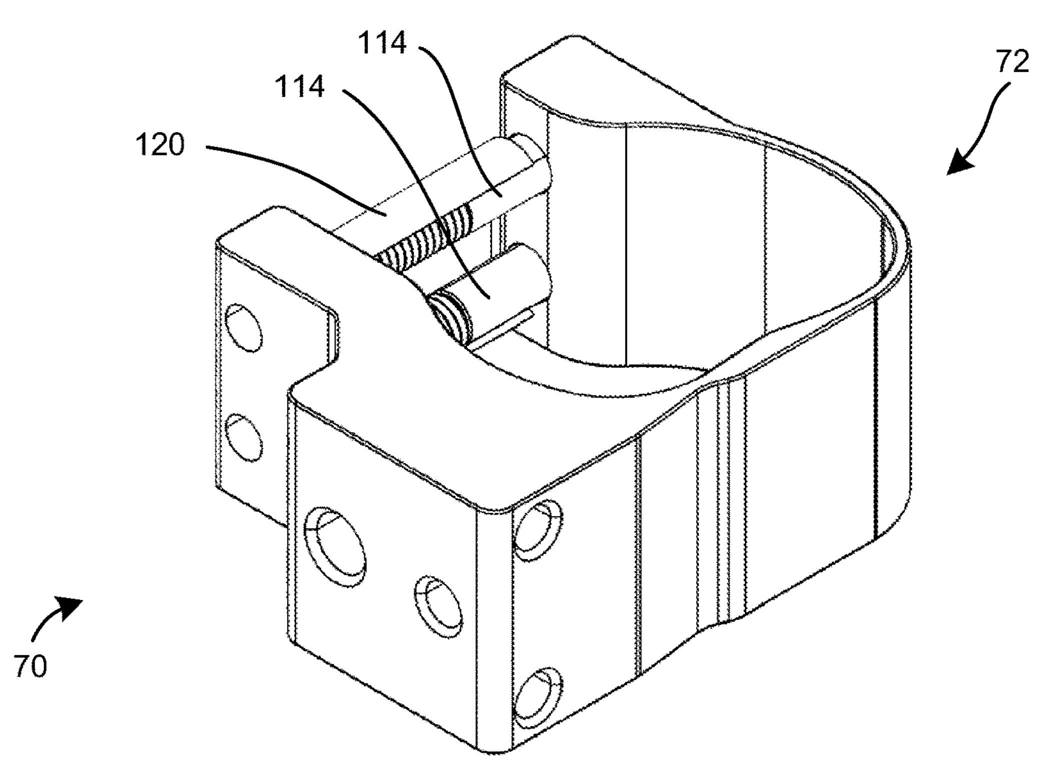
FIG. 5 is a rear right perspective view of the FIG. 1 clamp assembly.
Figure 6:
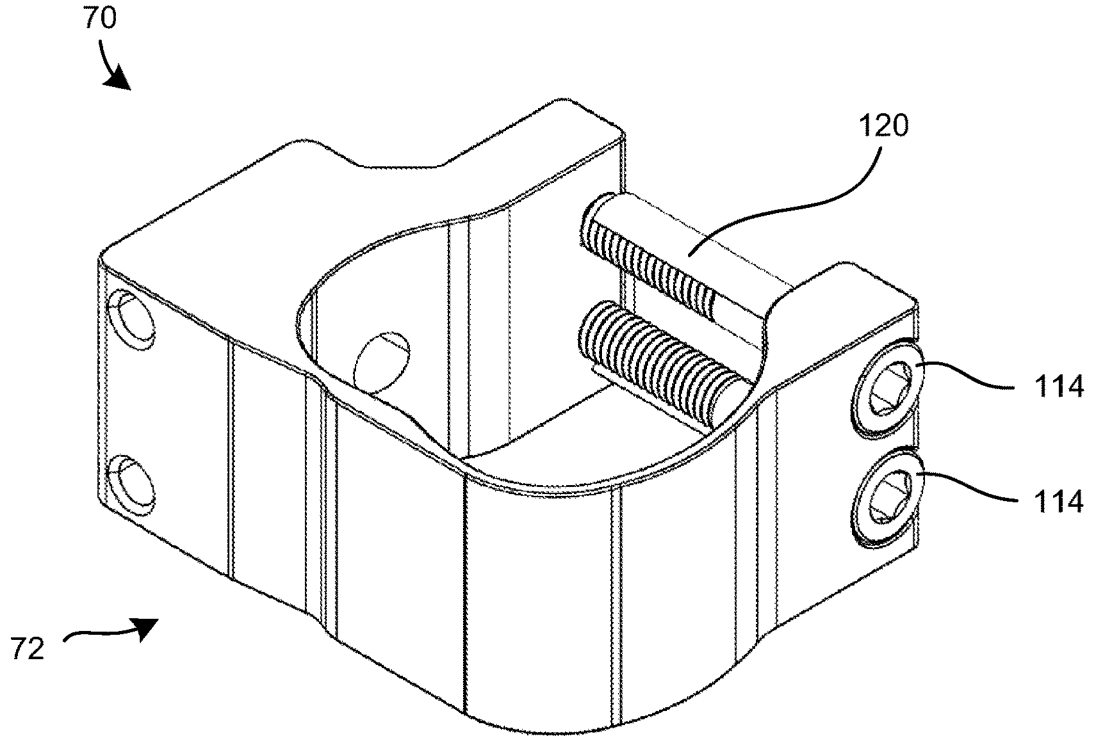
FIG. 6 is a rear left perspective view of the FIG. 1 clamp assembly.
Figures 7, 8, 9:
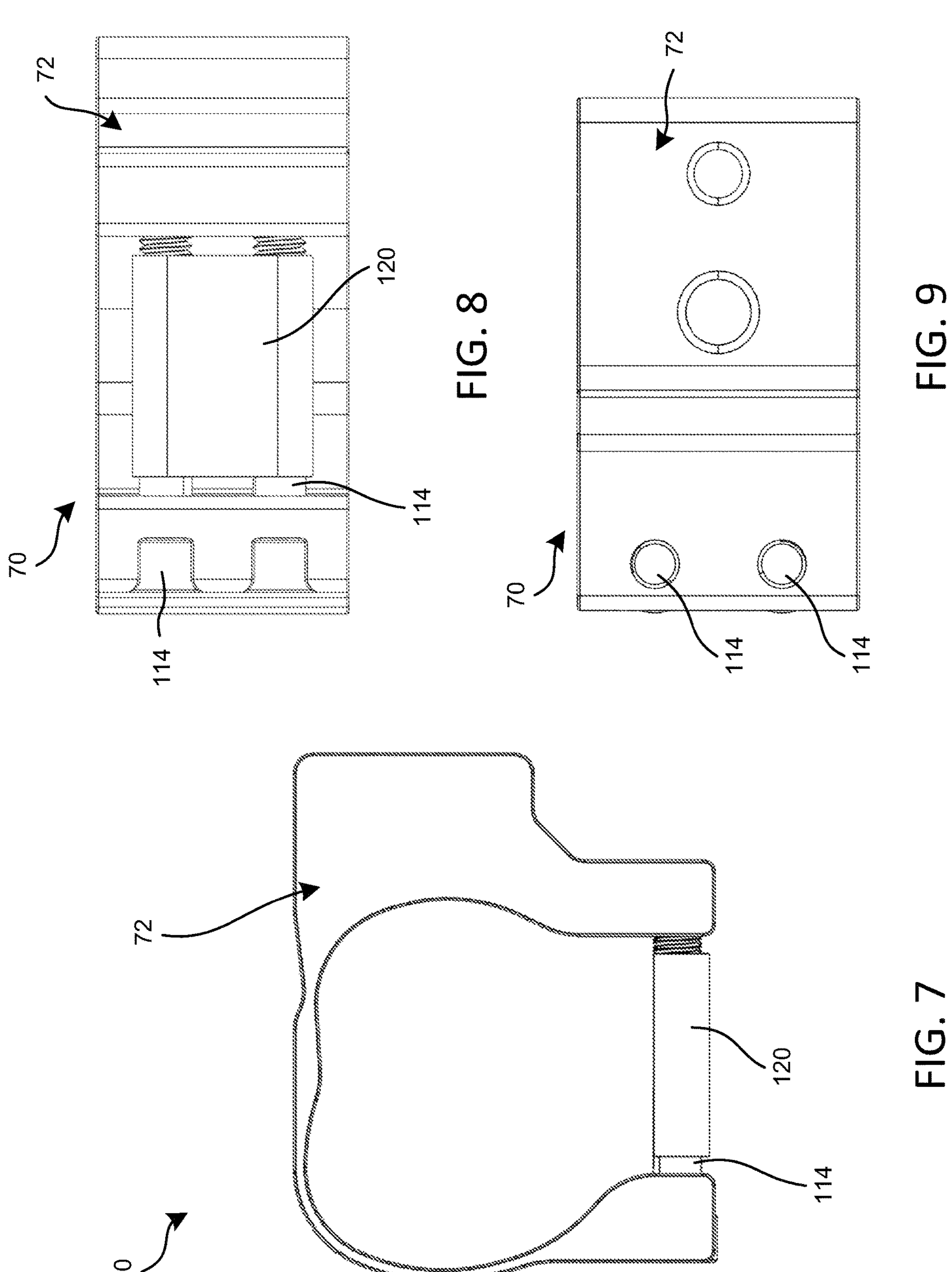
FIG. 7 is a top plan view of the FIG. 1 clamp assembly.
FIG. 8 is a front elevation view of the FIG. 1 clamp assembly.
FIG. 9 is a right-side elevation view of the FIG. 1 clamp assembly.
Figures 10, 11, 12:
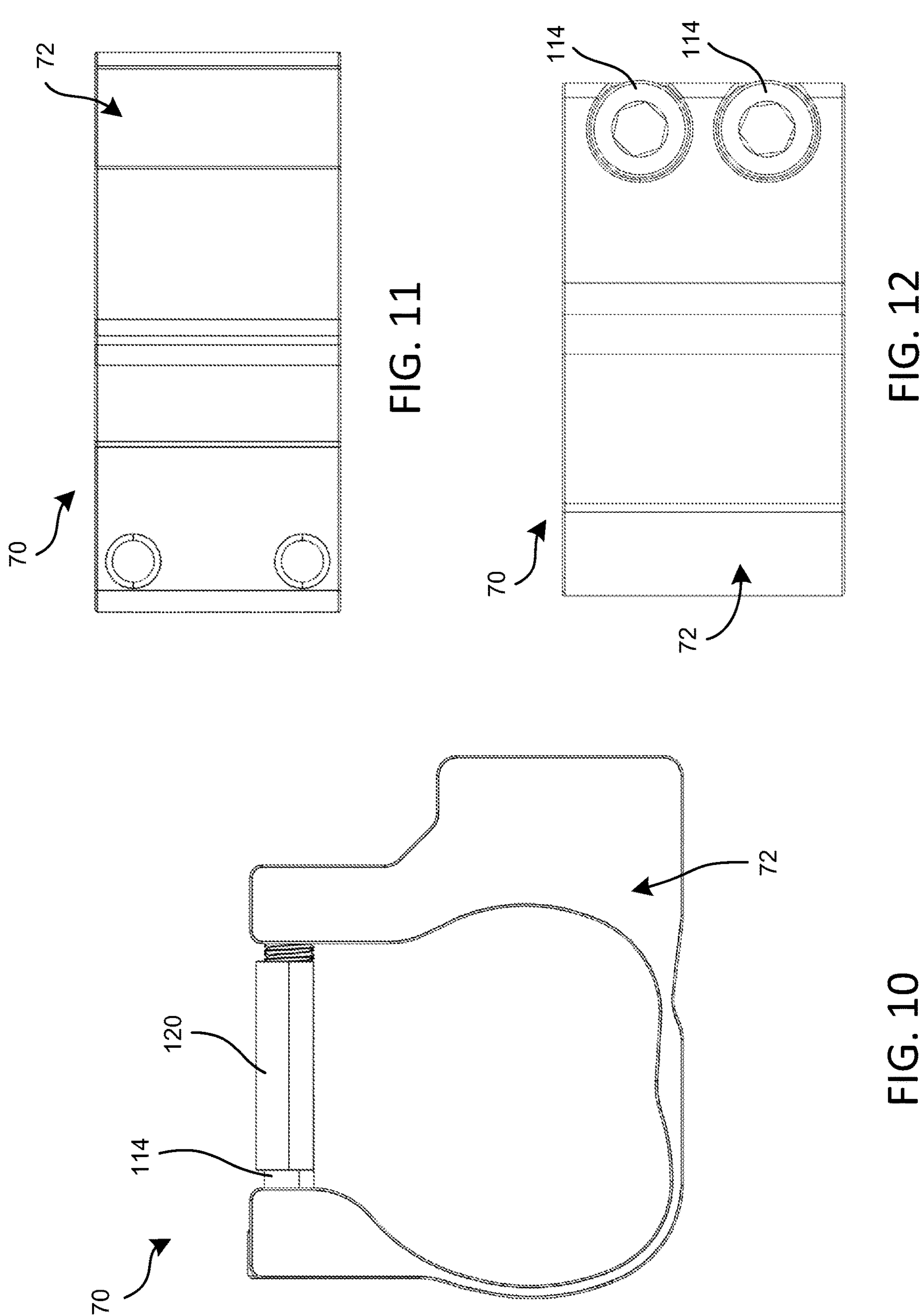
FIG. 10 is a bottom plan view of the FIG. 1 clamp assembly.
FIG. 11 is a rear elevation view of the FIG. 1 clamp assembly.
FIG. 12 is a left-side elevation view of the FIG. 1 clamp assembly.
Figure 13:
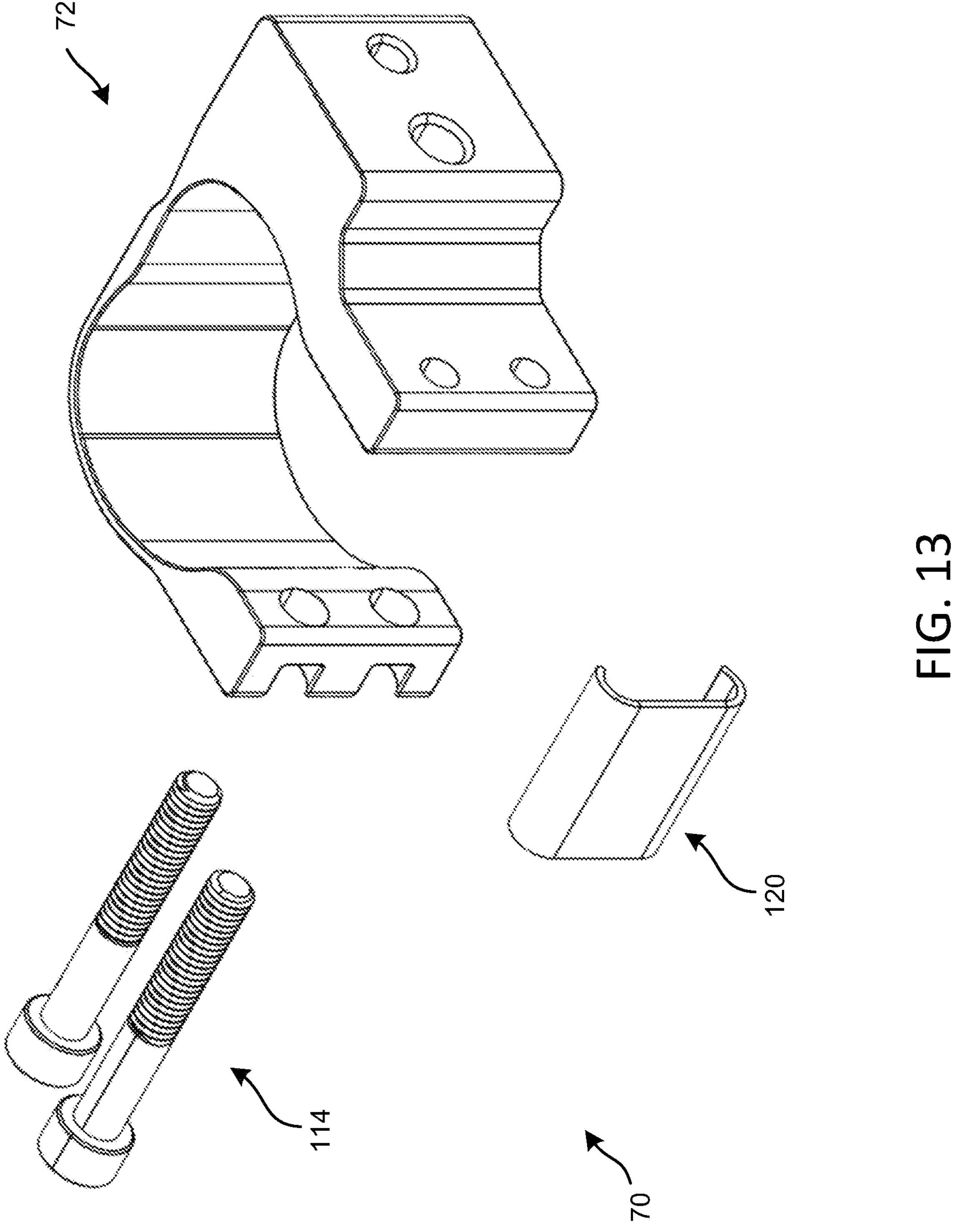
FIG. 13 is an exploded perspective view of the FIG. 1 clamp assembly.
Figure 21:
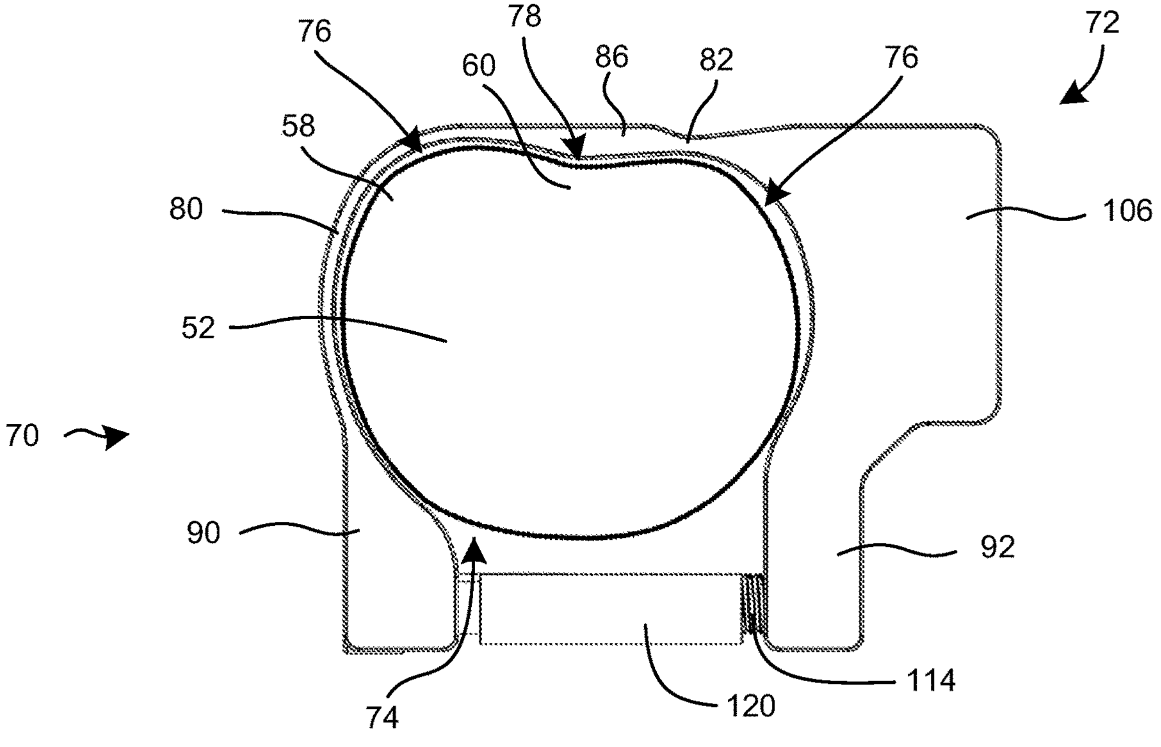
FIG. 21 is a cross-sectional view of the FIG. 20 clamp assembly and structural element as taken along line 21-21 in FIG. 20.

Referring to FIG. 2, a zoomed view of structural elements 52, attachment 64, and clamp assemblies 70 is illustrated. In the illustrated example, structural elements 52 include a first structural support 54 and a second structural support 56. As shown, the structural element 52 generally includes a round portion 58 and a recessed portion 60. Round portion 58 is generally convex and defines a round cross-section, as shown in FIG. 21, such as a generally circular or elliptical cross-section. Recessed portion 60 extends inward into structural element 52 and is generally concave in relation to round portion 58. The overall shape of the structural element 52 is non-circular due to the combination of round portion 58 and recessed portion 60. Structural element 52 defines a minimum diameter or width at a connection location where clamp assembly 70 is configured to couple to structural element 52. The minimum diameter or width corresponds to the narrowest cross-sectional dimension of structural element 52 at the connection location, such as the dimension across the recessed portion 60.

Clamp assemblies 70 can be attached on both structural supports 54 and 56 so as to couple attachment 64 between structural supports 54 and 56. As shown, attachment 64 extends between a first side 66 and a second side 68. In the illustrated example, clamp assemblies 70 can couple first side 66 of attachment 64 to first structural support 54 and can couple second side 68 of attachment 64 to second structural support 56. Clamp assemblies 70 allow a user to couple attachment 64 across multiple structural supports 54 and 56. Additionally, a user can couple attachment 64 to first structural support 54 and/or second structural support 56 at multiple points on each of structural support 54 and/or 56 using multiple clamp assemblies 70. In another example, a user can couple more than one attachment 64 to clamp assembly 70. For instance, a user can couple a windshield to one portion clamp assembly 70 and couple a mirror to another portion of the same clamp assembly 70. As should be appreciated, clamp assemblies 70 can be used to couple multiple distinct attachments 64 and/or to couple attachment 64 at multiple points on one or more structural elements 52.

FIGS. 3-13 illustrate a variety of views of clamp assembly 70. Clamp assembly 70 generally includes a clamp body 72, fasteners 114, and a spacer 120. Clamp body 72 forms the main structure of clamp assembly 70. Clamp body 72 is configured to couple to structural element 52 and to partially or fully conform to the shape of structural element 52. Clamp body 72 can be made of a generally rigid material, such as aluminum or steel. In one example, clamp body 72 can be formed using a single type of material and/or be monolithically formed from single piece of material. In an alternate example, clamp body 72 can be formed using multiple materials. For instance, clamp body 72 can include both a rigid material and a flexible material, such as a rubber, plastic, or even metal.

Fasteners 114 are configured to couple to clamp body 72. Fasteners 114 can be used to adjust the fit of clamp body 72 around structural element 52. Spacer 120 is configured to attach to fasteners 114 and to limit the adjustment range of clamp body 72 around structural element 52. In the illustrated example, spacer 120 covers fasteners 114 when attached.

Figure 14:
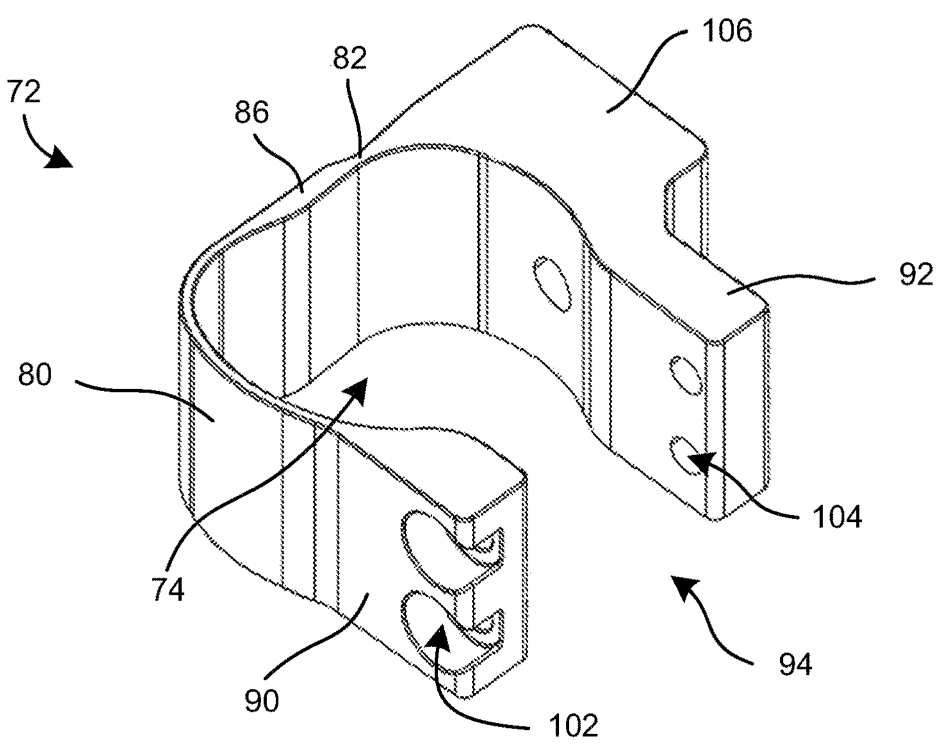
FIG. 14 is a front perspective view of a clamp body, a component of the FIG. 1 clamp assembly.
Figure 15:
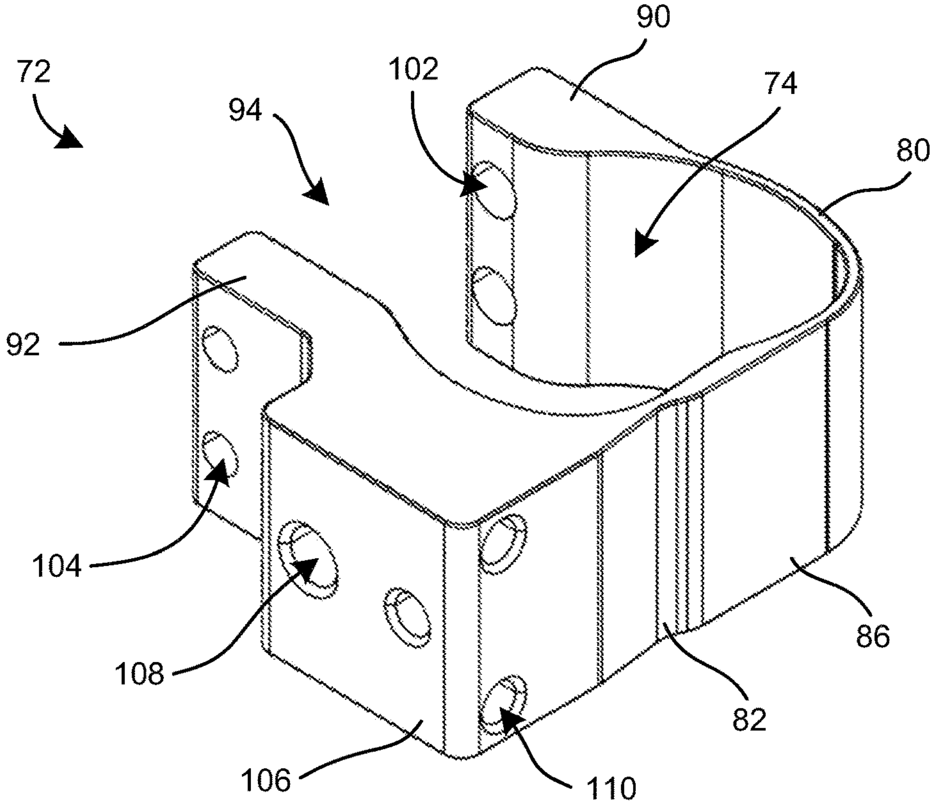
FIG. 15 is a rear perspective view of the FIG. 14 clamp body.
Figure 16:
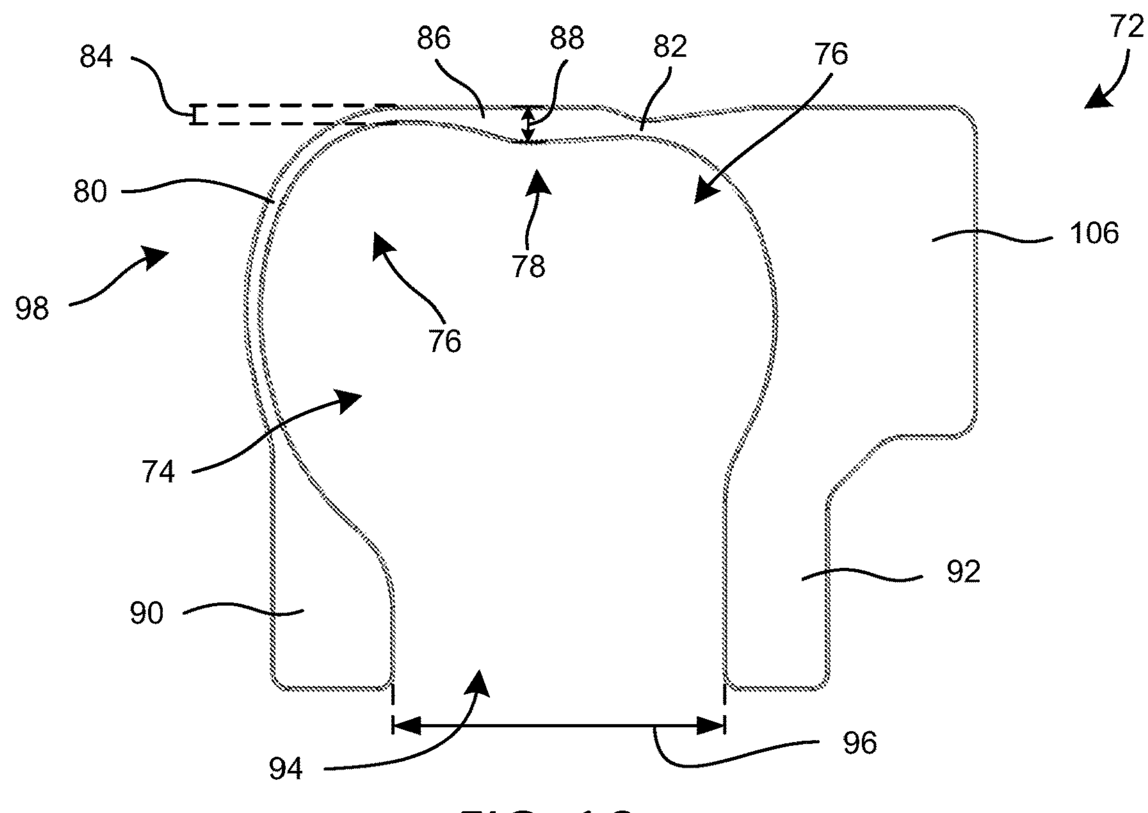
FIG. 16 is a top plan view of the FIG. 14 clamp body in a first configuration.

FIGS. 14-16 illustrate clamp body 72 in a first configuration 98. As shown, clamp body 72 defines a central opening 74. Clamp body 72 generally includes a first flexible portion 80, a second flexible portion 82, a non-flexible portion 86, a first end 90, a second end 92, and a mount portion 106. First and second flexible portions 80 and 82 and non-flexible portion 86 are positioned around central opening 74. Non-flexible portion 86 is positioned between first and second flexible portions 80 and 82. First and second flexible portions 80 and 82 and non-flexible portion 86 are positioned between first and second ends 90 and 92. Clamp body 72 defines a lateral opening 94 between first and second ends 90 and 92.

Central opening 74 is configured to receive structural element 52 when clamp assembly 70 couples to structural element 52. Central opening 74 is configured to at least partially conform to structural element 52. The shape of central opening 74 generally compliments the shape of structural element 52. For example, a cross-section of central opening 74 can mirror a cross-section of structural element 52 where clamp assembly 70 is configured to couple to structural element 52. As illustrated in FIGS. 14 and 15, central opening 74 has a non-circular shape, and as shown in FIGS. 1 and 2, structural element 52 has a non-circular shape. Using the non-circular shape of central opening 74, clamp assembly 70 is configured to fix to structural element 52 so as to inhibit or fully prevent rotation of clamp assembly 70 about structural element 52. By inhibiting rotation in this way, clamp assembly 70 can maintain the position and orientation of attachments 64 relative to structural element 52. Conversely, using traditional fully circular cage structure and clamp shapes may unintentionally allow a clamp and attachment to rotate about the cage structure.

Central opening 74 includes a concave portion 76 and a convex portion 78. When clamp assembly 70 couples to structural element 52, concave portion 76 of central opening 74 generally aligns with round portion 58 of structural element 52, and convex portion 78 generally aligns with recessed portion 60 of structural element 52. Concave portion 76 is configured to at least partially conform to round portion 58. Convex portion 78 is configured to at least partially conform to recessed portion 60.

First and second flexible portions 80 and 82 are configured to flex so as to allow a user to adjust the size and shape of central opening 74. Flexible portions 80 and 82 can be pliable so as to allow bending or other deformation, can be elastic so as to return to an original shape after being bent or otherwise deformed, and/or can be flexible in another way. By adjusting the shape of central opening 74, first and second flexible portions 80 and 82 allow clamp assembly 70 to conform closely to the shape of structural element 52. Flexible portions 80 and 82 allow clamp assembly 70 to conform to a variety of structural elements 52 with slightly different shapes and/or sizes. Further, flexible portions 80 and 82 can allow a user to adjust the shape of clamp body 72 to facilitate placing clamp body 72 around structural element 52, and subsequently can conform to the shape of structural element 52. Conversely, non-flexible portion 86 is generally rigid, especially in comparison to flexible portions 80 and 82. Non-flexible portion 86 is generally configured to maintain a consistent shape and can be shaped to conform to a certain portion of structural element 52. Flexible portions 80 and 82 in combination with non-flexible portion 86 support clamp body 72 to conform at least partially to the shape of structural element 52.

In the illustrated embodiment, first flexible portion 80 is positioned between non-flexible portion 86 and first end 90 around a circumference of central opening 74. In one example, first flexible portion 80 extends along an arc around central opening 74 corresponding to an angle at least 60 degrees. In another example, first flexible portion 80 extends along an arc corresponding to an angle up to 120 degrees. By extending around a substantial portion of central opening 74, first flexible portion 80 can considerably adjust the size and/or shape of central opening 74. Second flexible portion 80 is positioned between non-flexible portion 86 and mount portion 106. Second flexible portion 82 is a relatively small section of clamp body 72 compared to first flexible portion 80. In one example, second flexible portion 82 extends along an arc around central opening 74 corresponding to an angle of at most 20 degrees. In the illustrated example, non-flexible portion 86 can pivot about second flexible portion 82 relative to mount portion 106. As should be appreciated, flexible portions 80 and 82 could be sized and/or positioned differently within clamp body 72.

As shown, clamp body 72 defines lateral opening 94 between first end 90 and second end 92. Lateral opening 94 provides space for structural element 52 to enter into central opening 74 of clamp body 72. Flexible portions 80 and 82 allow a user to adjust the size of lateral opening 94. For example, a user can increase the size of lateral opening 94 from a default size such that lateral opening 94 can receive structural element 52.

Clamp body 72 defines first fastener openings 102 on first end 90 and second fastener openings 104 on second end 92. Fastener openings 102 and 104 are configured to receive fastener 114. First fastener openings 102 extend through first end 90 and open into lateral opening 94. Similarly, second fastener openings 104 extend through second end 92 and open into lateral opening 94. Fastener openings 102 and 104 allow fastener 114 to couple to clamp body 72 on first end 90 and second end 92. By coupling on first end 90 and second end 92, fastener 114 can be used to adjust the size of lateral opening 94 and/or to fix the position of first end 90 relative to second end 92. In the illustrated example, first fastener openings 102 can be counterbored. As shown in FIG. 14, first fastener openings 102 can partially extend out from a lateral side of first end 90. Second fastener openings 104 can be threaded so as to interface with threads on fastener 114. First fastener openings 102 can allow fastener 114 to pass through first end 90 and into lateral opening 94, and second fastener openings 104 can allow fastener 114 to couple to second end 92 through threads. Alternatively, fastener 114 could couple to a nut and/or another locking mechanism outside of first end 90 and/or second end 92. As should be appreciated, first fastener openings 102 and/or second fastener openings 104 could be counterbored, countersunk, threaded, unthreaded, and/or adjusted another way that is different than in the illustrated embodiment. Additionally, fastener openings 102 and 104 are generally configured receive fastener 114 in the form of a threaded bolt and/or screw. As should be appreciated, first and second ends 90 and 92 could be configured to couple to a different type of fastener, such as a latch, strap, and/or another mechanism.

Clamp body 72 defines first mounting holes 108 on mount portion 106. First mounting holes 108 are configured to receive a fastener, such as a screw and/or bolt, to couple attachment 64 to clamp body 72. Clamp body 72 can optionally define second mounting holes 110 on mount portion 106 which are similarly configured to receive a fastener to couple to attachment 64. In the illustrated example, first mounting holes 108 are positioned on one side of mount portion 106, and second mounting holes 110 are positioned on another side and oriented transversely to first mounting holes 108. By orienting first mounting holes 108 transversely to second mounting holes 110, clamp body 72 allows a user to mount one or more attachments 64 in different orientations. For example, mounting holes 108 and 110 can allow a user to mount a windshield in one orientation and a light in another orientation using the same clamp assembly 70. In one example, mounting holes 108 and 110 can be threaded. Optionally, mounting holes 108 and/or 110 can be unthreaded, countersunk, and/or counterbored. As should be appreciated, the amount and arrangement of mounting holes 108 and 110 can be varied to allow clamp body 72 to couple to any number of attachments 64 in a variety of orientations and positions.

As shown in FIG. 16, flexible portions 80 and 82 at least partially define concave portion 76 of central opening 74. First end 90, second end 92, and/or mount portion 106 can additionally partially define convex portion 76. Non-flexible portion 86 defines convex portion 78 of central opening 74. As shown in FIG. 16, first flexible portion 80, second flexible portion 82, and mount portion 106 form a round side profile that is generally consistent around central opening 74 and which defines convex portion 76. Conversely, non-flexible portion 86 disrupts concave portion 76 by protruding into central opening 74 and defining convex portion 78. Therefore, flexible portions 80 and 82 are generally positioned around round portion 58 of structural element 52 and non-flexible portion 86 is generally positioned in recessed portion 60 of structural element 52 when clamp assembly 70 couples to structural element 52. Because non-flexible portion 86 is more rigid than flexible portions 80 and 82, positioning non-flexible portion 86 in recessed portion 60 can more effectively inhibit rotation of clamp body 72 about structural element 52 and provide greater stability than positioning flexible portions 80 and 82 in recessed portion 60.

Flexible portions 80 and 82 define a flexible thickness 84. Flexible thickness 84 can be defined by the thinnest part of first flexible portion 80 and/or second flexible portion 82. In one example, flexible thickness 84 is consistent between flexible portions 80 and 82. In another example, flexible thickness 84 can be defined by the thicker of flexible portions 80 and 82. Non-flexible portion 86 defines a non-flexible thickness 88. Non-flexible thickness 88 can be defined by the thickest part of non-flexible portion 86. In the illustrated example, flexible portions 80 and 82 are thinner than the rest of clamp body 72, and flexible thickness 84 is smaller than non-flexible thickness 88. In one example, a material can be pliable, elastic, and/or otherwise flexible when formed with a thickness less than or equal to flexible thickness 84. The same material can be stiff, hard, and/or otherwise rigid when formed with a thickness greater than or equal to non-flexible thickness 88. Further, using a larger non-flexible thickness 88 relative to flexible thickness 84 can help to form convex portion 78 of central opening 74.

In the illustrated embodiment, flexible portions 80 and 82 can be integrally formed with clamp body 72. For example, clamp body 72 can be formed as a single piece made entirely of aluminum, steel, plastic, and/or another material. By reducing flexible thickness 84 relative to the thicknesses across the rest of clamp body 72, flexible portions 80 and 82 can be configured to flex while the rest of clamp body 72 can be rigid and configured to maintain the same shape. For example, the material of clamp body 72 can be flexible when formed with a thickness up to flexible thickness 84 but can be rigid when formed with a thickness of at least non-flexible thickness 88. Clamp body 72 can be formed using a variety of techniques, such as casting with a mold, machining from a solid piece of material, bending a sheet of material, and/or using another process. Alternatively, flexible portions 80 and 82 can be made of an elastic and/or pliable material, such as rubber and/or plastic, that is distinct from the rest of clamp body 72.

Figure 17:
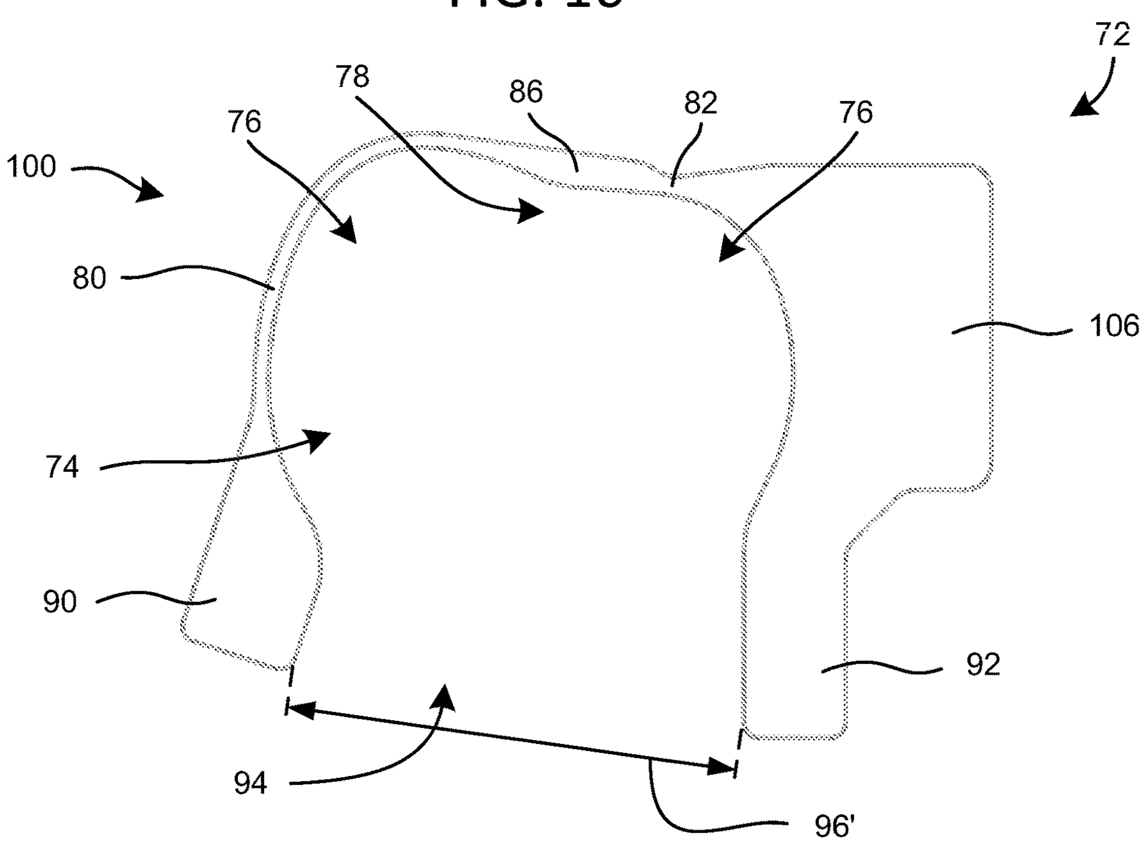
FIG. 17 is a top plan view of the FIG. 14 clamp body in a second configuration.

Referring to FIGS. 16 and 17, clamp body 72 is configured to flex between a first configuration 98 and a second configuration 100. Flexible portions 80 and 82 allow first and second ends 90 and 92 to move relative to one another so as to expand or contract lateral opening 94. A user may flex clamp body 72 in this way to facilitate coupling clamp assembly 70 to structural element 52. First configuration 98 can be a rest or default configuration for clamp body 72 such that clamp body 72 is biased to be in first configuration 98. Second configuration 100 can be a flexed configuration such that first and/or second ends 90 and 92 are not in the default positions. As should be appreciated, clamp body 72 could include a hinge and/or another mechanism to adjust the size of lateral opening 94 in addition to or as an alternative to flexible portions 80 and 82.

Lateral opening 94 defines an opening width 96. When clamp body 72 is in first configuration 98, as illustrated in FIG. 16, clamp body 72 is relaxed, and opening width 96 is at a default distance. In one example, opening width 96 can be at a minimum distance when clamp body 72 is in first configuration 98. In another example, opening width 96 is less than a width of structural element 52 such that structural element 52 cannot pass through lateral opening 94 when clamp body 72 is in first configuration 98. Thus, when first and second ends 90 and 92 are in first configuration 98, the distance between first end 90 and second end 92 is smaller than the minimum diameter or width at the connection location. In first configuration 98, the shape of central opening 74 generally conforms to the shape of structural element 52. In one example, clamp body 72 can flex slightly within first configuration 98 so as to adjust the shape of central opening 74 to better conform to the shape of structural element 52.

As shown in FIG. 17, opening width 96' when clamp body 72 is in second configuration 100 is larger than opening width 96 when clamp body 72 is in first configuration 98. Opening width 96' is larger than the minimum diameter or width of structural element 52 so as to allow structural element 52 to pass into central opening 74 when clamp body 72 is in second configuration 100. Thus, when first and second ends 90 and 92 are in second configuration 10, the distance between first end 90 and second end 92 is larger than the minimum diameter or width at the connection location. Flexible portions 80 and 82 allow clamp body 72 to flex such that lateral opening 94 can expand to receive structural element 52 and then contract such that central opening 74 conforms around structural element 52. In this way, a user can flex clamp body 72 from first configuration 98 to second configuration 100 to allow the user to position clamp body 72 around structural element 52. The user can subsequently flex clamp body 72 back to first configuration 98 to allow the user to secure clamp body 72 onto structural element 52.

Figure 18:
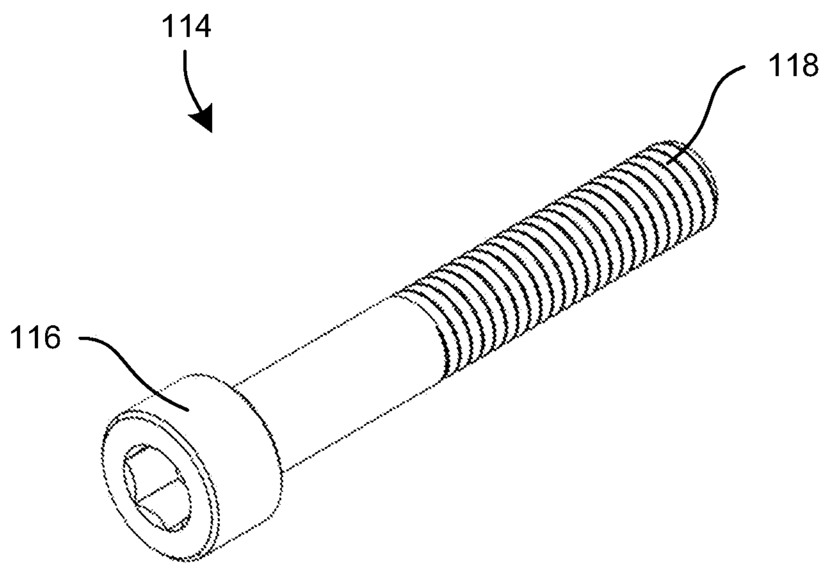
FIG. 18 is a perspective view of a fastener, a component of the FIG. 1 clamp assembly.

Referring to FIG. 18, one embodiment of fastener 114 is shown. Fastener 114 is configured to couple to clamp body 72 to fix and/or limit the opening width 96 of lateral opening 94. In the illustrated example, fastener 114 can be a bolt. Fastener 114 generally includes a head end 116 and a threaded end 118. In the illustrated embodiment, head end 116 can couple to first end 90 using first fastener opening 102 (shown in FIGS. 14 and 15). In one example, head end 116 can be positioned within a counterbored portion of first fastener opening 102. Optionally, a portion of head end 116 can extend laterally outward from first end 90 when positioned in first fastener opening 102. Threaded end 118 can couple to second end 92 using second fastener opening 104 (shown in FIGS. 14 and 15). Threaded end 118 is generally configured to interface with threads on second fastener opening 104. A user can rotate fastener 114 by hand and/or using a tool, such as a screwdriver, wrench, and/or drill, to engage threaded end 118 with second fastener opening 104. As should be appreciated, the threads could be arranged differently and/or a different type of fastener 114 could be used in clamp assembly 70.

Figure 19:
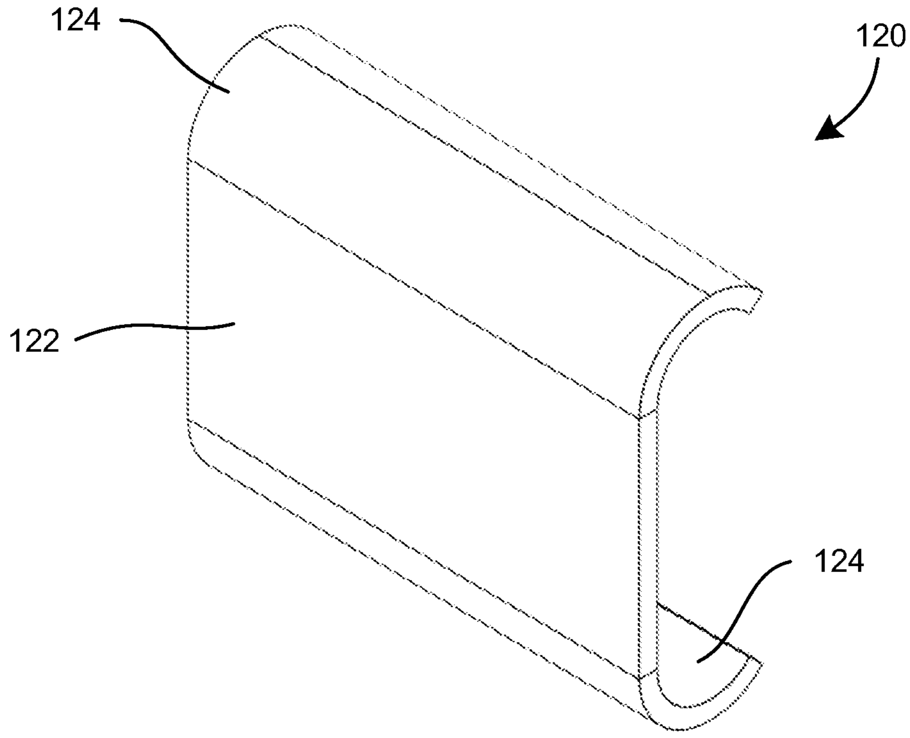
FIG. 19 is a perspective view of a spacer, a component of the FIG. 1 clamp assembly.

Referring to FIG. 19, one embodiment of spacer 120 is shown. Spacer 120 is generally configured to be positioned between first end 90 and second end 92 of clamp body 72 so as to limit the minimum size of lateral opening 94. Spacer 120 generally includes a flat portion 122 and curved portions 124. Flat portion 122 extends between fasteners 114 and covers a gap between two fasteners 114, as shown in FIGS. 3-6. Curved portions 124 are shaped to conform to the cylindrical shape of fasteners 114. Spacer 120 includes a curved portion 124 on either side of flat portion 122. Each curved portion 124 is configured to be positioned around one fastener 114 so as to couple spacer 120 to fasteners 114. In one embodiment, a width of spacer 120 is the same as opening width 96 in FIG. 16, so as to prevent opening width 96 from decreasing below a default width. In another embodiment, a width of spacer 120 is slightly less than opening width 96 so as to provide some clearance between spacer 120 and first and/or second ends 90 and 92 while limiting the amount that opening width 96 can decrease. As should be appreciated, clamp assembly 70 could use another type of spacer 120 or not include spacer 120 at all.

Figure 20:
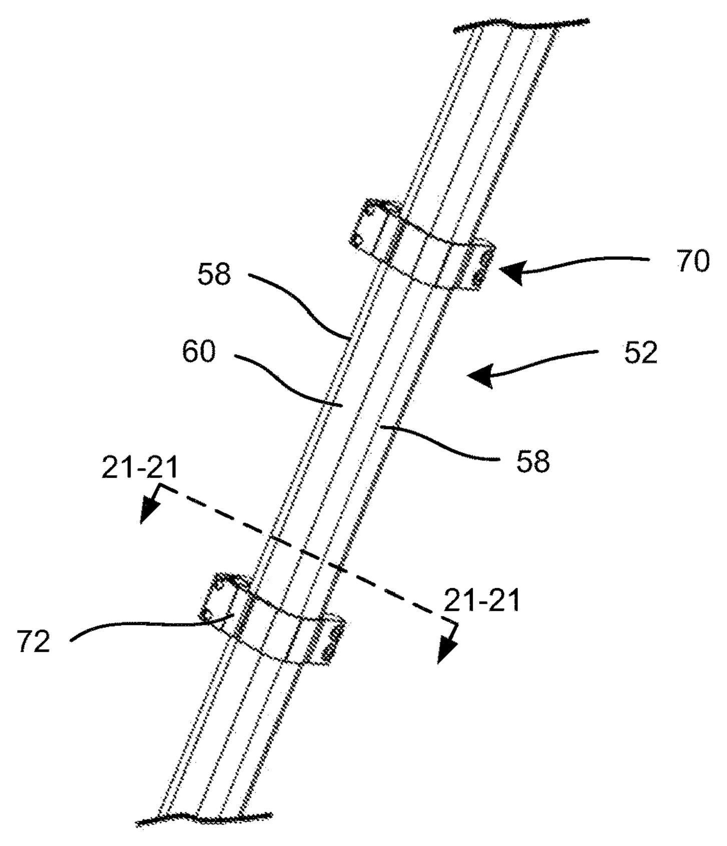
FIG. 20 is a perspective view of the FIG. 1 clamp assembly attached to a structural element, a component of the FIG. 1 vehicle.

Referring to FIGS. 20 and 21, additional views of clamp assembly 70 attached to structural element 52 are shown. FIG. 21 illustrates a cross-sectional view of clamp assembly 70 and structural element 52. Generally, the cross-sectional shape of clamp body 72 is consistent longitudinally along structural element 52. As shown, clamp body 72 conforms around structural element 52, and the shape of central opening 74 generally matches the shape of structural element 52. Specifically, flexible portions 80 and 82 extend around round portion 58 of structural element 52, and round portion 58 is positioned within concave portion 76 of central opening 74. Non-flexible portion 86 is positioned partially within recessed portion 60 of structural element 52, and recessed portion 60 is positioned within convex portion 78 of central opening 74. By positioning non-flexible portion 86 in recessed portion 60 of structural element 52, clamp body 72 can inhibit or fully prevent structural element 52 from rotating within central opening 74. Clamp assembly 70 is configured to maintain a desired position and/or orientation of clamp assembly 70 and attachment 64 by inhibiting rotation of clamp body 72 relative to structural element 52. In this way, clamp assembly 70 can sufficiently couple to structural element 52 and attachment 64 so as to maintain the coupling when a user operates vehicle 50. For example, clamp assembly 70 can remain coupled to structural element 52 and attachment 64 despite vibrations, sudden jerks, and/or other movements of vehicle 50.

As shown, central opening 74 can be slightly larger than structural element 52. In the illustrated embodiment, clamp assembly 70 can sufficiently couple to structural element 52 even when central opening 74 of clamp body 72 does not fully conform to the shape of structural element 52. For example, clamp assembly 70 can sufficiently couple to structural element 52 so as to inhibit or fully prevent clamp body 72 from slipping, shaking, and/or moving in another way relative to structural element 52. Alternatively, a user can adjust fastener 114 so as to reduce the size of central opening 74 to conform to the shape and/or size of structural element 52 more closely or even exactly. Conforming closely to structural element 52 can enforce the coupling of clamp assembly 70 to structural element 52. In another example, central opening 74 extends beyond structural element 52 around lateral opening 94. For instance, clamp body 72 can exactly or almost exactly conform to structural element 52 except near lateral opening 94. The extra space near lateral opening 94 can allow for increased clearance when attaching clamp assembly 70 around structural element 52, allow for more accessible placement of fasteners 114 and spacer 120, and/or may facilitate attaching clamp assembly 70 to structural element 52 in another way. As should be appreciated, the degree to which central opening 74 conforms to structural element 52 can vary while still allowing clamp body 72 to sufficiently couple to structural element 52.

While the present disclosure has been illustrated and described in detail in the drawings and foregoing description, the same is to be considered as illustrative and not restrictive in character, it being understood that a preferred embodiment has been shown and described and that all changes, equivalents, and modifications that come within the spirit of the claimed invention defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The language used in the claims and the written description and in the above definitions is to only have its plain and ordinary meaning, except for terms explicitly defined above. Such plain and ordinary meaning is defined here as inclusive of all consistent dictionary definitions from the most recently published (on the filing date of this document) general purpose Merriam-Webster dictionary.

The invention claimed is:

1. An assembly for use with a non-circular structural element of a vehicle frame member having a minimum diameter or width at a connection location, the assembly comprising:

a U-shaped clamp body comprising a first end and a second end, wherein said U-shaped clamp body defines a central opening that comprises a convex portion and a concave portion that each extend partially around said central opening, wherein said central opening is adapted to conform at least in part to a shape of the non-circular structural element of the vehicle frame member, wherein said U-shaped clamp body defines a lateral opening between said first and second ends and wherein, when said first and second ends are in a second configuration, a distance between said first and second ends is larger than the minimum diameter or width at the connection location; and a fastener that selectively extends between said first and second ends of said clamp body across said lateral opening, wherein said fastener is configured to vary the distance between said first end and said second end, wherein, when said fastener extends between said first and second ends of said clamp body across said lateral opening and when said first and second ends are in a first configuration, the distance between said first end and said second end is smaller than the minimum diameter or width at the connection location.

2. The assembly of claim 1, wherein said clamp body comprises a first flexible portion that permits said first and second ends to flex between said first configuration and said second configuration.

3. The assembly of claim 2, wherein said clamp body further comprises a second flexible portion and a non-flexible portion positioned between said first and second flexible portions.

4. The assembly of claim 3, wherein said non-flexible portion of said clamp body defines said convex portion of said central opening.

5. The assembly of claim 4, wherein said first flexible portion and said second flexible portion define a flexible portion thickness, and wherein said non-flexible portion defines a non-flexible portion thickness that is greater than said flexible portion thickness.

6. The assembly of claim 1, further comprising a spacer configured to be positioned between said first end and said second end, and wherein said spacer is configured to limit a minimum distance of said lateral opening between said first end and said second end.

7. The assembly of claim 1, wherein said first end and said second end define fastener openings, and wherein said fastener is configured to attach to said first and second ends through said fastener openings.

8. The assembly of claim 7, wherein said fastener comprises a threaded end, wherein said fastener opening on said second end is threaded, and wherein said threaded end of said fastener is configured to cooperate with said fastener opening on said second end.

9. The assembly of claim 1, wherein said clamp body comprises a mount portion that is configured to couple an attachment to said assembly, and wherein said mount portion defines a mounting hole.

10. The assembly of claim 9, wherein said mount portion defines a second mounting hole, and wherein said second mounting hole is oriented in a direction transverse to said first mounting hole.

11. The assembly of claim 1, wherein said clamp body is unitarily formed as a single piece.

12. A kit for use with a non-circular structural element of the vehicle frame member, the kit comprising:

the assembly of claim 1;

an attachment configured to couple to said U-shaped clamp body.

13. The kit of claim 12, wherein the attachment is a windshield.

14. An assembly for use with a non-circular structural element of a vehicle frame member having a minimum diameter or width at a connection location, the assembly comprising:

a U-shaped clamp body comprising a first end, a second end, a first flexible portion and a non-flexible portion, wherein said U-shaped clamp body defines a central opening that comprises a convex portion and a concave portion that each extend partially around said central opening, wherein said non-flexible portion defines said convex portion of said central opening, and wherein said central opening is adapted to conform at least in part to a shape of the non-circular structural element of the vehicle frame member; and a fastener that selectively extends between said first and second ends of said clamp body across said lateral opening, wherein said fastener is configured to vary a distance between said first end and said second end;

wherein said U-shaped clamp body defines a lateral opening between said first and second ends and wherein said first flexible portion permits said first and second ends to flex between a first configuration and a second configuration, wherein, when said first and second ends are in said second configuration, said lateral opening is larger than the minimum diameter or width at the connection location, and wherein, when said first and second ends are in said first configuration, the distance between said first end and said second end is smaller than the minimum diameter or width at the connection location, and wherein, when said fastener extends between said first and second ends of said clamp body across said lateral opening, said first and second ends are in said first configuration.

15. The assembly of claim 14, further comprising:

a spacer configured to be positioned between said first end and said second end, and wherein said spacer is configured to limit the minimum distance of said lateral opening between said first end and said second end.

16. The assembly of claim 14, wherein said clamp body is unitarily formed as a single piece.

17. The assembly of claim 14, wherein said clamp body comprises a metallic material.

18. The assembly of claim 14, wherein said clamp body further comprises a second flexible portion, wherein said non-flexible portion is positioned between said first and second flexible portions.

19. A kit for use with a non-circular structural element of a vehicle frame member, the kit comprising:

the assembly of claim 14;

an attachment configured to couple to said U-shaped clamp body.

20. The kit of claim 19, wherein the attachment is a windshield.

* * * * *